Sept. 10, 1940.　　　　　　　H. FORD　　　　　　　2,214,456
MOTOR VEHICLE
Filed Nov. 1, 1937　　　3 Sheets-Sheet 2

INVENTOR
Henry Ford
BY Edwin C. McRae
ATTORNEY

Sept. 10, 1940.     H. FORD     2,214,456
MOTOR VEHICLE
Filed Nov. 1, 1937     3 Sheets-Sheet 3
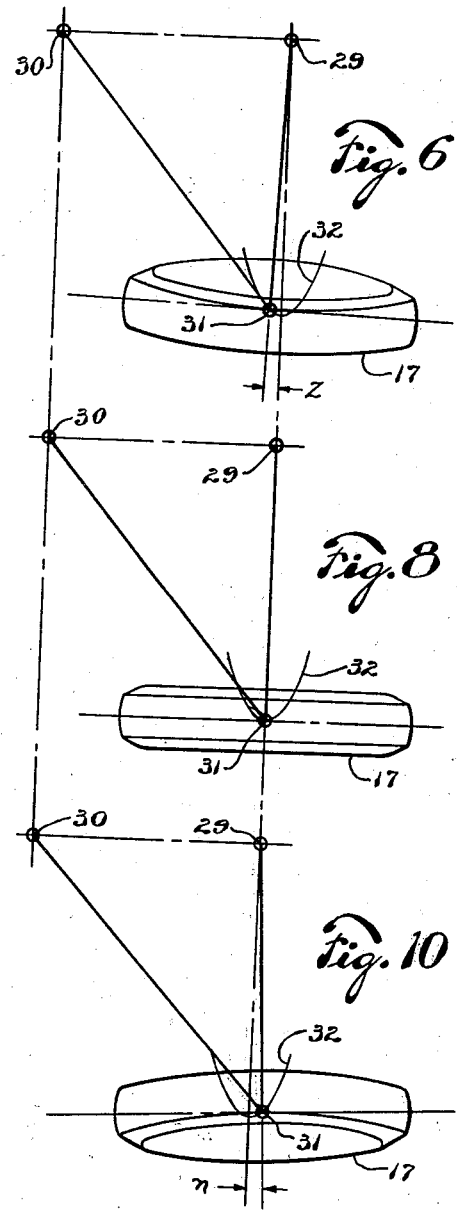
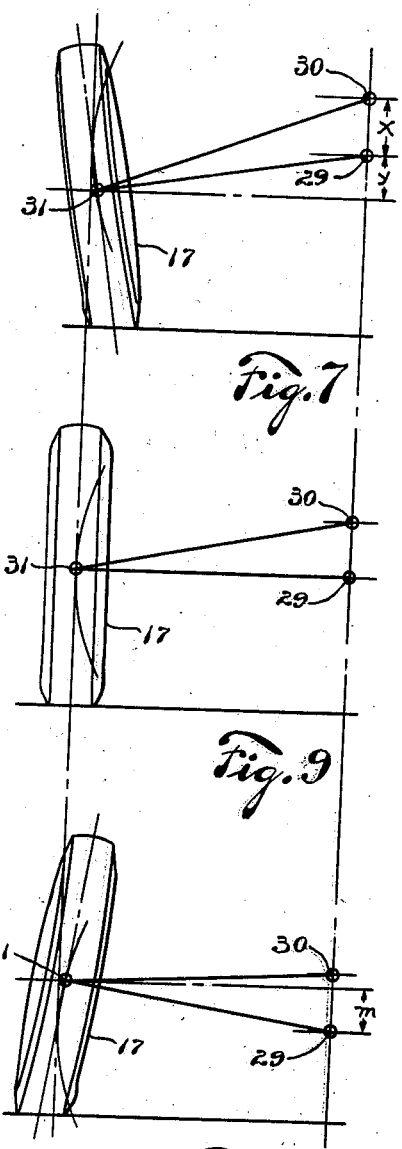
INVENTOR
Henry Ford
BY Edwin C. McRae
ATTORNEY Patented Sept. 10, 1940

2,214,456

UNITED STATES PATENT OFFICE 2,214,456

MOTOR VEHICLE

Henry Ford, Dearborn, Mich., assignor to Ford Motor Company, Dearborn, Mich., a corporation of Delaware Application November 1, 1937, Serial No. 172,107

5 Claims. (Cl. 180—73)

The object of my invention is to provide motor vehicle chassis in which is incorporated an independently sprung wheel suspension.

Independently mounting a vehicle wheel is advantageous only when the unsprung weight is reduced, as a reduction in unsprung weight improves the riding qualities of the car. Heretofore, independent wheel suspensions have been commercially adapted only to the front or steering wheels of vehicles with the result that only the unsprung weight of the front axle is eliminated. The unsprung portions of these front wheel designs weigh nearly as much as the older type of front axle so that very little gain is effected when used only in connection with the front wheels. The vehicle rear axle comprises a housing, a differential, driving gears, torque tube and axle shafts, which together weigh many times as much as the conventional front axle. Consequently a proportionately greater improvement in the riding qualities of the car can be made by independently springing the rear wheels. It is therefore the object of my invention to provide independent springing for the rear or driving wheels of a vehicle.

However, a rear wheel suspension is complicated by reason of the rear wheels being driven, which necessitates providing universal joints at each side of the differential through which the drive to the wheels is obtained. In all former like constructions known to the applicant, four universal joints were required, one on each side of the differential and driving gear housing and one adjacent to each rear wheel. Telescopic axle shafts were required to extend between these joints. As a result, such constructions were extremely costly, were subject to great wear and backlash, and were a source of service trouble which more than offset the improved riding qualities produced thereby.

A further object of my invention is therefore to provide an independently sprung rear driving axle construction wherein only two universal joints are required and wherein no telescopic shafts are used.

Specifically, my invention comprises means for swinging the rear wheels vertically around the differential housing and also producing a toe-in and toe-out to the driving wheels when they are respectively below and above the vertical centerline of the differential. In this way scuffing of the tires is prevented so that normal tire life is obtained, whereas with all former types of two universal joint constructions known to applicant, the tire life was so short that the constructions were impractical.

With these and other objects in view, my invention consists in the arrangement, construction and combination of the various parts of my improved device, as described in the specification, claimed in my claims and illustrated in the accompanying drawings, in which:

Figure 6 is a diagrammatic plan view of one of the rear wheels when the vehicle chassis is unloaded.

Figure 7 is a diagrammatic end view of the wheel when in the position shown in Figure 6.

Figure 8 is a diagrammatic plan view of one of the rear wheels with the chassis loaded to an intermediate or running load.

Figure 9 is a diagrammatic end view of the construction shown in Figure 8.

Figure 10 is a diagrammatic plan view of one of the rear wheels with the chassis loaded to its maximum capacity.

Figure 11 is a diagrammatic end view of the construction shown in Figure 10.

Figure 1:
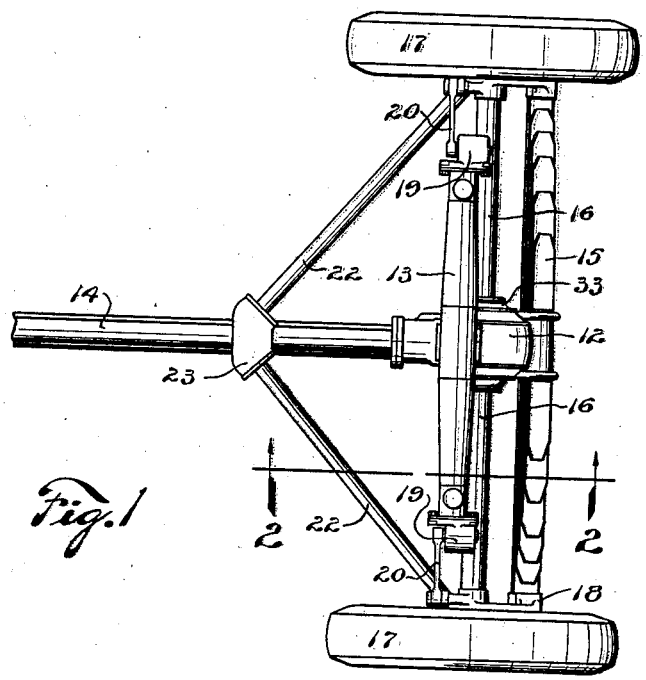
Figure 1 is a plan view of the rear portion of my improved vehicle chassis.
Figure 2:
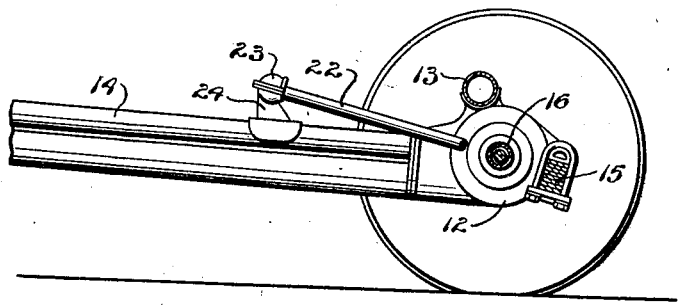
Figure 2 is a sectional view, taken on the line 2—2 of Figure 1.
Figure 3:
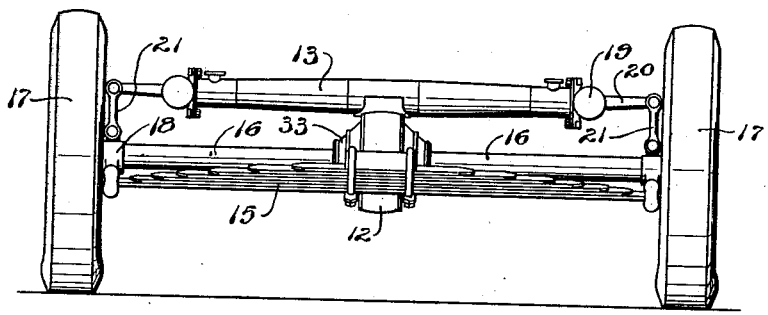
Figure 3 is an end view of the chassis shown in Figure 1.

Referring to the accompanying drawings, I have used the reference numeral 12 to indicate an axle ring gear and different housing. A tubular rear cross member 13 is supported at its center point upon the housing 12 in position to extend laterally across the vehicle. A torque tube 14 is fixedly secured to the housing 12 and extends forwardly to the engine of the vehicle. I have also provided a transverse spring 15 with its center portion fixedly secured to the housing 12. From the foregoing, it will be noted that the torque tube 14, housing 12, cross member 13, and the center portion of springs 15 are all fixedly secured together as a unit. The body of the vehicle is adapted to be supported directly upon the outer ends of the cross member 13 so that the body, torque tube, differential housing and cross member are all supported by the spring 15.

Axle tubes 16 extend laterally from each side of the housing 12, which tubes are mounted upon ball members 33 on the housing 12. The tubes 16 may oscillate vertically or longitudinally through a limited degree around the respective sides of the housing 12. An axle shaft, not shown in the drawings, extends from within the housing 12 outwardly through each of the tubes 16 and wheels 17 are fixedly secured to the outer ends of these shafts. The differential, drive gear, axle shafts and universal joints have not been shown, as they form no part of the invention claimed herein. A driven wheel construction is shown herein, and my improved suspension is more advantageous when used in connection with a driven wheel; however, my suspension is equally as operable when the wheels 17 are made trailing wheels.

It will be noted that the spring 15 extends laterally from each side of the housing 12 and that each end is secured to a brake anchor plate 18 which plates are fastened to the outer ends of the tubes 16. Thus, the weight of the sprung parts is supported through the spring 15 upon the wheels 17.

The axle tubes are mounted upon the ball members 33 so that the wheels must oscillate around the centers of these balls as the spring 15 flexes. To prevent undue oscillation of the wheels, shock absorbers 19 are fixed to the ends of the cross member 13, these shock absorbers having arms 20 which extend outwardly therefrom and connect with the anchor plates 18 by means of suitable links 21.

A pair of radius rods 22 are fixed to the respective anchor plates 18 and extend inwardly and forwardly where they terminate in ball members 23. These ball members are positioned vertically above the torque tube 14. A bracket 24 is secured to the upper side of the torque tube 14 adjacent to the ball members 23, which bracket has a pair of sockets therein in which the balls 23 are universally mounted. It will be noted from Figure 1 that the ball end 23 and the ball member 33 associated with each axle tube 16 are positioned on a longitudinally extending line and that the lines joining each pair of axes are parallel. These lines are not level from front to rear but extend upwardly and forwardly in a side elevation. The positioning of the ball member 23 with respect to the center of oscillation of the axle tube 16 is extremely important as this position so turns the wheels that tire scuffing is prevented.

Before describing the means which I have provided for preventing scuffing of the tires, it may be well to briefly describe the reason that tires used on somewhat similar suspensions have heretofore failed. The extensive use of low pressure balloon type tires has aggravated the conditions causing excessive tire wear, so that only slightly defective geometry in the rolling of the wheels will cause excessive tire wear.

Figure 4:
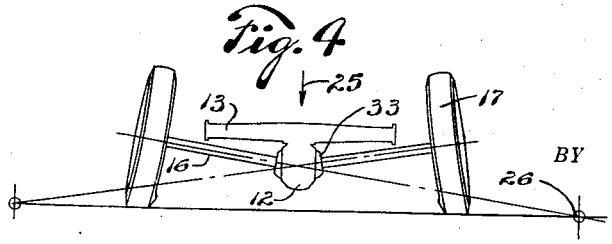
Figure 4 is a diagrammatic end view, illustrating the positions of the vehicle wheels when the chassis is loaded to its extreme position.

Referring to Figure 4, it will be seen that when the vehicle is loaded to its full capacity, the load being applied in the direction shown by arrow 25, the cross member 13 is moved downwardly which forces the differential housing and adjacent ends of the axle tubes also downwardly. This causes the axle shafts to assume the inclined positions shown in Figure 4 where their ball ends are nearer the ground than the wheel ends. The top portions of the wheels are at this time tipped inwardly and the bottom portions spread outwardly. When the conventional balloon tire is used, the area in contact with the ground covers a considerable area. With the modern tire and automobile the area in contact has a width of 4 to 5 inches and a length of 10 to 12 inches.

When the axle tubes are in the position shown in Figure 4, the normal tendency of the left hand wheel is to roll in a circle around a center marked 26 while the right wheel tends to roll around a center on the opposite side of the car. The tire in this case becomes a section of a cone which tends to roll around its pointed end. It will be understood that radius rods or the like prevent such rolling action, but, nevertheless, the tendency is to cause such action. Further, it is only by allowing the wheels to roll around their respective conical centers that a true rolling action can ordinarily be obtained with an inclined axis. If the wheel is forced to go in a straight direction, then scuffing of the tire inevitably occurs. The inside edge of the tire, due to the angle of the wheel cone, follows a smaller circle than the outer edge thereof.

The applicant proposes to compensate for this tendency by giving the wheels a toe-out when the chassis frame is in its loaded position. Although wheels with inclined axes have a tendency to rotate around the point where a continuation of the axle touches the ground, nevertheless, when the wheel is given a sufficient toe-out, the tendency of the wheel is to depart from the curved path it would normally take and rotate in a straight line. The toe-out is just sufficient to cause the wheel to roll in a tangential path rather than in its curved circular path.

Figure 5:
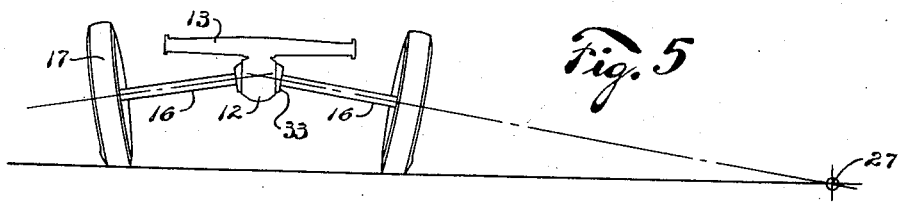
Figure 5 is a diagrammatic end view, illustrating the positions of the wheels with the chassis unloaded.

It may be briefly stated that my invention comprises positioning the two wheels outwardly in opposite directions when the axles are inclined, due to a load beyond the normal operating load, and gradually reducing the toe-out until the wheels are straight ahead when the axles assume a horizontal position. When the car is empty and the load is still further reduced, the axles are inclined with their outer ends downwardly. The left wheel then rolls around a point 27. The wheels are given a toe-in when the axles are in the position shown in Figure 5.

There are many ways of accomplishing such positioning but the simple device shown herein is believed to operate as efficiently.

It will be noted from the drawings that the spherical end 33 of each axle tube, oscillates around a fixed center 29 in the differential housing. The radius rod ball ends 23 swing around the fixed centers 30. The centers 30 are elevated a substantial distance above the centers 29. The amount of this elevation is shown in Figure 7 by dimension $x$, which remains fixed throughout all movements of the wheel. The longitudinal spacing between the points 29 and 30 also remains fixed. The point where the axle tube 16 intersects the adjacent radius rod 22 has been given the reference numeral 31. Figures 6 and 7 show the position of the left rear wheel with the chassis frame unloaded so that the points 29 and 30 are elevated a distance $y$ above their normal positions. In this elevated position the top portion of the wheel is tipped outwardly. Because the point 30 is permanently fixed a distance $x$ above the point 29, the point 31 does not swing in a vertical plane but describes a circle in a rearwardly inclined plane which when viewed from above is projected as an elliptical path, shown by line 32. When the chassis is unloaded, as shown in Figures 6 and 7, the point 31 swings downwardly and forwardly to the position shown in Figure 6. Point 31 is then spaced forwardly a distance z ahead of the transverse center line through the point 29. Thus the axle tube 16 is swung forwardly around the point 29. This produces a toe-in for the wheel to the same extent that would be produced were the axle tube 16 to be moved in a flat plane around the point 29 a similar distance z. This toe-in is just sufficient to counteract the tendency of the wheel to rotate around the point 27 and to make it track in a straight line.

When the car is normally loaded, the points 29 and 30 are pressed down a distance y or until the axle tubes are level. In this case the point 31 is moved rearwardly along the path 32 until the axle tubes 16 are exactly in a lateral position relative to the differential housing. In this case neither toe-in nor toe-out of the wheel is required, so that in this position the axle functions exactly as the conventional axle construction. However, when the vehicle is loaded to its capacity, the point 29 is moved a distance m beneath the normal horizontal line through the wheel centers so that the left hand axle tube 16 is inclined in a direction opposite to that shown in Figure 7. When the wheel is in this position, the point 31 is moved still further along the path 32 so that it is spaced rearwardly from the lateral center line through the differential the distance m. This tends to swing the wheel rearwardly around the center 29 to produce the desired toe-out.

Figure 12:
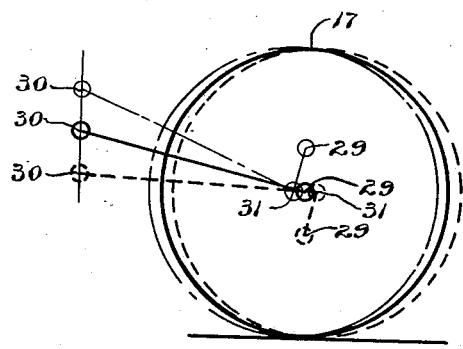
Figure 12 is a diagrammatic view, illustrating the three longitudinal positions of each rear wheel produced respectively by no load, running load, and maximum load on the chassis.

Referring to Figure 12, I have shown by dot and dash lines the forward position of the wheel when the chassis is under no load. When the chassis is loaded to its normal amount, the position of the wheels is shown by solid lines and when the chassis is fully loaded to its maximum capacity, the position of the wheels and center points are shown by dotted lines. Each rear wheel, therefore, in effect moves forwardly and rearwardly around the centers 29, as the load of the car is varied. It should be kept in mind that in this specification the movement of the wheels is described solely as a result of loading the chassis. It should also be kept in mind that the movement is identical when the wheel oscillates due to its travel over rough roads.

Among the many advantages arising from the use of my improved construction, it may be well to mention that I have provided an independently sprung driving axle construction wherein only one universal joint is provided for each wheel and which incorporates the relatively rigid radius rod and axle tube construction. The construction wherein the radius rod, anchor plate and axle tube are all rigidly fixed together has proved itself to be much stronger for a given weight than is possible where a universal joint is provided adjacent to each wheel.

Still a further advantage of my improved construction is that the unsprung parts of the suspension are extremely light, considering the strength provided, and consist only of the weight of the wheel and one-half the weight of the radius rods 22, axle and axle tubes. The major portion of the spring 12 is sprung weight, and the differential housing, torque tube and cross member are likewise sprung weight.

Still a further advantage of my improved construction is that the wheels are particularly resistant to braking loads and all other loads tending to move the wheels fore or aft.

Some changes may be made in the arrangement, construction, and combination of the various parts of my improved device without departing from the spirit of my invention, and it is my intention to cover by my claims such changes as may reasonably be included within the scope thereof.

I claim as my invention:

1. A wheel suspension for motor vehicles comprising, a differential driving gear unit fixedly mounted in said vehicle at the rear central portion thereof, axle tubes projecting laterally from opposite sides of said unit, said tubes being secured by oscillating joints with said unit, a bracket fixed in said vehicle forwardly and upwardly from said unit, and radius rods each having one end pivotally secured to said bracket, said rods extending rearwardly and outwardly in opposite directions to the outer ends of said axle tubes to which they are secured, so that said radius rods and adjacent axle tubes form two independent units which may swing around parallel axes which extend upwardly from the rear end of said vehicle, for the purpose described.

2. A wheel suspension for motor vehicles comprising, a differential driving gear unit fixedly mounted in said vehicle at the rear central portion thereof, axle tubes projecting from the respective sides of said unit, said tubes being secured by ball joints to said unit, a torque tube extending forwardly from said unit to which it is fixedly secured, said torque tube having a bracket affixed thereto which extends upwardly therefrom, radius rods pivotally secured to the upper end of said bracket, said rods extending diagonally and rearwardly and outwardly from said bracket to the free ends of said axle tubes to which they are secured so that each radius rod and adjacent axle tube may pivot as a unit around a longitudinal extending axis, said axes being parallel to each other and extending upwardly from the rear end of said vehicle, and a transverse spring having its central portion affixed to said differential gear unit and with its ends extending outwardly where they are secured to the outer ends of the axle tubes, respectively.

3. A wheel suspension for a motor vehicle comprising, a differential driving gear unit fixed at the center rear portion of said vehicle, a torque tube fixed to and extending forwardly from said unit, a pair of axle tubes extending laterally from opposite sides of said differential driving gear unit, said tubes being connected with said driving gear unit so that their outer ends may swing both vertically and horizontally, relative thereto, a bracket secured to said torque tube forwardly of said driving gear unit, which bracket extends to position above said torque tube, and radius rods extending from said bracket to the ends of said axle tubes respectively, the inner ends of said radius rods being pivotally secured to said bracket and the outer ends thereof fixedly secured to said axle tubes so that said radius rods and adjacent axle tubes form two independent units which may swing around parallel axes which extend upwardly from the rear end of said vehicle, for the purpose described.

4. A wheel suspension for motor vehicles comprising, a differential driving gear unit fixedly mounted in said vehicle at the rear central portion thereof, axle tubes secured for universal movement to the respective sides of said housing so that their free ends may swing both vertically and horizontally relative thereto, a torque tube extending forwardly from said differential driving gear unit, a bracket secured to said torque tube which bracket projects upwardly therefrom, radius rods having their inner ends pivotally mounted in said bracket with their other ends extending respectively to the outer ends of said axle tubes to which they are fixedly secured, and a transverse spring having its ends secured to the outer ends of said axle tubes and with its central portion secured to said driving gear unit so that said radius rods and adjacent axle tubes form two independent units which may swing around parallel axes which extend upwardly from the rear end of said vehicle, for the purpose described.

5. A wheel suspension for motor vehicles comprising, a differential driving gear unit fixedly mounted in said vehicle at the rear central portion thereof, axle tubes projecting laterally from opposite sides of said unit, said tubes being secured by oscillating joints with said unit, a bracket fixed in said vehicle forwardly and upwardly from said unit, radius rods each having one end pivotally secured to said bracket, said rods extending erarwardly and outwardly in opposite directions to the outer ends of said axle tubes to which they are secured so that said rods and adjacent axle tubes form two independent members which may swing around parallel axes, which axes extend upwardly from the rear of the vehicle, and a transversely extending leaf spring having its center portion fixed to said unit in such position that its ends flex in a plane perpendicular to the plane of said axes, the ends of said spring being secured to the outer ends of said axle tubes, respectively.

HENRY FORD.